United States Patent
Seneczko et al.

[11] Patent Number: 5,715,858
[45] Date of Patent: Feb. 10, 1998

[54] GLOBE VALVE STICKING PREVENTION

[75] Inventors: Thomas M. Seneczko, New Berlin; David R. Stewart; Steven M. Miles, both of West Allis; Ronald W. Streeter, Okauchee, all of Wis.

[73] Assignee: Johnson Service Company, Milwaukee, Wis.

[21] Appl. No.: 387,159

[22] Filed: Feb. 10, 1995

[51] Int. Cl.$^6$ ............................. B08B 9/00; F16K 51/00
[52] U.S. Cl. .................. 137/244; 137/315; 137/454.5
[58] Field of Search .................... 137/238, 242, 137/244, 454.2, 454.5, 454.6, 546, 549, 550, 315; 251/61, 62, 129.01; 15/104.16

[56] References Cited

U.S. PATENT DOCUMENTS

| | | | |
|---|---|---|---|
| 68,733 | 9/1867 | Grant | 137/244 |
| 348,338 | 8/1886 | Pickering | 137/546 |
| 352,591 | 11/1886 | Tower | 137/242 |
| 840,860 | 1/1907 | Müller | 137/549 |
| 914,069 | 3/1909 | Peileke | 137/546 |
| 979,384 | 12/1910 | Davis | 137/244 |
| 1,001,111 | 8/1911 | Wood | 137/244 |
| 1,116,689 | 11/1914 | Gehrke | 137/549 |
| 1,204,106 | 11/1916 | Wing | 137/549 |
| 1,825,543 | 9/1931 | Redding | 137/546 |
| 1,898,816 | 2/1933 | Crossen | 137/549 |
| 3,648,718 | 3/1972 | Curran | 137/315 |
| 3,762,685 | 10/1973 | Curran | 137/454.6 |
| 4,281,678 | 8/1981 | Claycomb | 137/238 |
| 4,460,025 | 7/1984 | Scholle et al. | 137/244 |
| 4,497,335 | 2/1985 | Masuda | 137/244 |
| 4,621,656 | 11/1986 | Iehimaru | 137/242 |
| 4,736,766 | 4/1988 | Bathrick et al. | 137/315 |
| 5,186,206 | 2/1993 | Mayes | 137/244 |
| 5,381,818 | 1/1995 | Nendzig et al. | 137/242 |
| 5,469,881 | 11/1995 | Phan et al. | 137/315 |

OTHER PUBLICATIONS

Control Valve Handbook, Fisher Controls Company, Marshalltown, Iowa, Figure 1–20, pp. 18–19 and first page of section 5 (1977).
Valve Selection Handbook, 3rd Edition, R. W. Zappe, Gulf Publishing Company, Houston, p. 48 (1991).
Honeywell, 60–2126–2, p. 7 (1993).
Landis & Gyr, Installation Instruction 129–174 for VE VMP Electronic 2–Way and 3–Way Valves, p. 1 (1993).
Stockham, Valves & Fittings Pocket Guide, pp. 38–39 and 43–44.
ISA Handbook of Control Valves, 2nd Edition, J. W. Hutchison, Editor in Chief, Instrument Society of America, Pittsburg, PA, pp. 383–384.
F. G. Shinskey, Flow and Pressure Control Using Variable–Speed Motors, The Foxboro Company, pp. 161–167.
Les Driskell, Control–Valve Selection and Sizing, Instrument Society of America, pp. 200–201 and 311–312.

*Primary Examiner*—George L. Walton
*Attorney, Agent, or Firm*—Harness, Dickey & Pierce, P.L.C.

[57] ABSTRACT

A control valve that minimizes sticking of the plug assembly by particles such as welding byproducts in the associated heating system. The valve port having a continuous decrease of diameter from the port opening toward the valve seat and an additional stepped decrease in diameter adjacent to the valve seat, which enables particles wedged in the clearance between the plug and port to be released and guided away from the port.

12 Claims, 3 Drawing Sheets

GLOBE VALVE STICKING PREVENTION

BACKGROUND OF THE INVENTION

This invention relates generally to low capacity globe style control valve assemblies and, in particular, to the valve plug and seat of a globe style valve typically used to regulate hot water or cold water through coils typically found in HVAC systems.

In general, globe valves are utilized as a mode of regulating liquid flow. Globe valves can be utilized as an on/off switch to stop and start the flow of liquid, or can be used to regulate the rate of flow of liquid. The globe valve is a close-down valve in which the plug is moved directly on and off the valve seat in a substantially linear manner. Typically, the low capacity globe valve will have small plug-to-port clearances to aid in the regulation of flow.

However, this design has some limitations. Given the small clearances between the plug and seat as noted in the Valve Selection Handbook, 3rd Edition R. W. Zappe (Gulf Publishing Company, Houston) 1991, pg. 48, the plug and seat may trap solids which travel in the flowing fluid. When solids are trapped between the plug and seat, two potential problems that may occur are "sticking" and "plugging". Sticking occurs when a particle gets wedged between the plug and seat which prevents the valve from fully closing, or results in damage to the seat or plug. Plugging occurs as particles collect within the plug and seat clearance thereby reducing the flow.

Sticking is often a result of foreign particulate debris, such as welding byproducts, thread burrs, or dirt, introduced into the system when the valves or pipes are installed. These foreign particles may be too large to pass through the clearance between the plug and seat. This problem is recognized and addressed in the literature. Honeywell, in brochure 60-2126-2 1993 page 7, recommends that pipe dope be sparingly applied and care be taken to prevent pipe chips and scale from entering the piping. Landis & Gyr, in the installation instruction 129–174 1993 for VE VMP Electronic Valves, recommends cleaning the piping system before start-up. In addition, Stockham Valves & Fittings Pocket Guide, page 38, recommends that new lines be flushed with water and steam to remove any line scale or foreign matter to avoid damage to the valve seat.

Despite these instructions and precautions, sticking remains a problem that may result in the necessity to shut down the system in order to service the affected valve.

Plugging, however, may occur not only from foreign debris introduced in the lines, but from any particulate that may be suspended in the fluid. In this case, particulate may be trapped between the plug and seat, reducing or blocking the flow. The ISA Handbook of Control Valves, 2nd Edition, J. W. Hutchison, Editor in Chief, Instrument Society of America, Pittsburg, Pa., pg. 383, recommends, as a means of reducing plugging, that a smooth bore body design with few dead end passages be employed. Another possibility is the use of a filter to assure that particulate too large to pass through the valve are removed from the system. However, filters are ineffective if the particulate first encounters and is unable to pass the valve. Accordingly, in such a system, a filter may be needed before every valve to prevent valve contamination.

An alternative approach is described in U.S. Pat. No. 5,186,206 issued on Feb. 16, 1993. The approach therein described employs a valve trim having a stepped cross-section rather then a continuous taper. The stepped cross-section is accomplished by dramatically reducing the diameter of the valve tapered plug. When the stepped cross-section of the plug clears the seat, the flow is dramatically increased thereby clearing any accumulated particulate that would otherwise reduce the flow. This approach is described as a self-cleaning mechanism which is activated by fully opening the valve to allow maximum flow.

The approach described in U.S. Pat. No. 5,186,206 does not discourage particulates from entering the valve-to-seat clearance. In addition, the '206 system requires that the valve be fully opened and flow allowed to reach a maximum rate in order to clear the particulate. Finally the '206 system is directed toward pressure control valves in particulate-laden or sticky fluid systems.

Accordingly, it would be desirable to have a valve configured to permit full travel and allow the plug to fully engage the seat without sticking even when particles such as welding byproducts remain in the system.

SUMMARY OF THE INVENTION

The present invention features an actuated valve which permits the successful full travel and closure of the plug on the valve seat where there are particles such as welding byproducts in the system. An embodiment of the valve includes a port with a continuous decrease in diameter from the port opening toward the valve seat at a predetermined angle. A second embodiment of the valve includes a port with a tapered decrease in diameter extending from the port opening to the valve seat. The second embodiment further includes a plug extending beyond the land region when the plug assembly is positioned within the port permitting a predetermined maximum flow. A third embodiment of the valve includes a port having a stepped decrease in diameter adjacent to the valve seat creating an undercut area.

The present invention reduces sticking of the plug in the port by permitting particles to be released into the valve body when the valve is actuated to the closed position. Particles that would otherwise be lodged between the port and plug are released into the undercut area below the valve seat and guided away from the plug along the tapered area. Once the flow is ceased, the particles settle into the dirt trap located below the port area. The problem of sticking is further reduced by the extended plug which reduces the number of particles permitted to enter the port area.

DESCRIPTION OF THE DRAWING

FIG. 1b is an exploded view of a portion of the valve port, undercut, land and seal circumscribed by circle B in FIG. 1a.

DETAILED DESCRIPTION OF THE PREFERRED EMBODIMENT

Figure 1B:
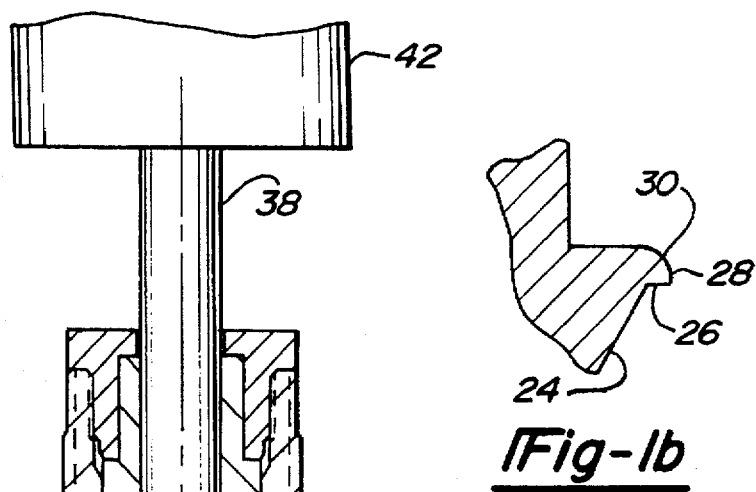
Figure 1A:
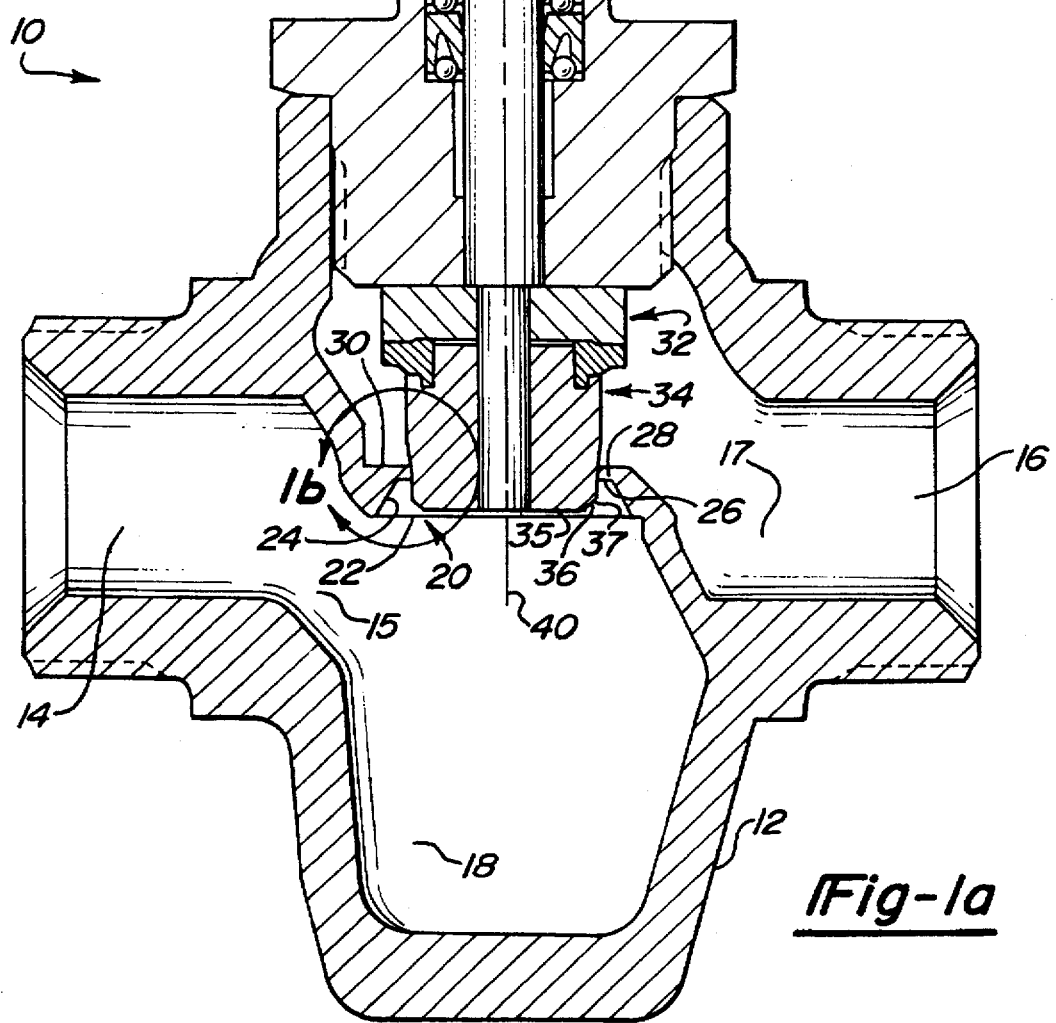
FIG. 1a is a cross-sectional view of a valve in an open position.

Referring to FIG. 1a, a valve 10, such as a globe valve, includes a valve body 12, a port 20, a valve seat 30, a plug assembly 32, and an actuator 42. Valve body 12 includes an inlet 14 and an outlet 16. Inlet 14 and outlet 16 are connected by inlet passageway 15, port 20 and outlet passageway 17 which permits fluid communication therebetween which is controlled by the cooperation of assembly 32, port 20 and seat 30. Valve body 12 further includes a dirt trap 18 which is located below port 20 and between inlet 14 and port 20 along inlet passageway 15. Dirt trap 18 has a truncated conical or cylindrical shape and includes a diameter greater than or equal to port opening entrance 22 diameter and is further provided with a depth to diameter ratio of about one. That is the depth of dirt trap 18 should be at least equal to the diameter of the dirt trap opening.

Figure 2:
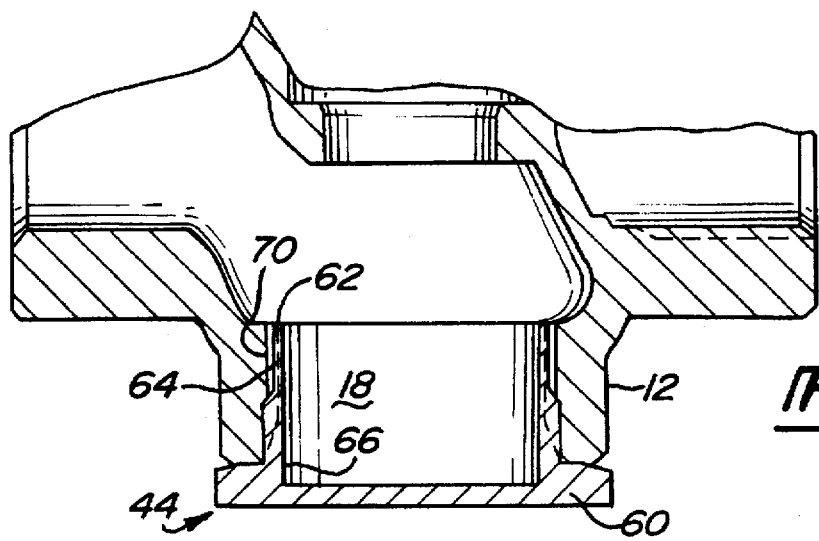
FIG. 2 is a cross-sectional view of a first alternative embodiment of the valve body.

In an alternative embodiment illustrated in FIG. 2 valve body 12 includes an annular opening formed by a wall 70 extending from inlet passageway 15. This alternative embodiment further comprises a cap 44 having a base 60 and an annular cap wall 62 extending from base 60. Cap wall 62 includes an outer surface 64 provided with a male thread to removably attach cap 44 within globe valve wall 70 provided with a female thread. In this embodiment dirt trap 18 is formed by base 60 and an inner surface 66 of cap wall 62.

Figure 3:
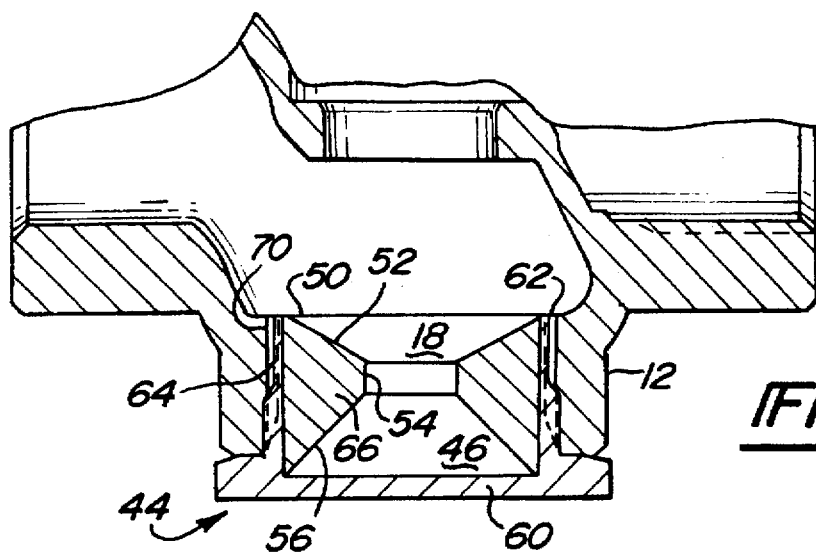
FIG. 3 is a cross-sectional view of a second alternative embodiment of the valve body.
Figure 4:
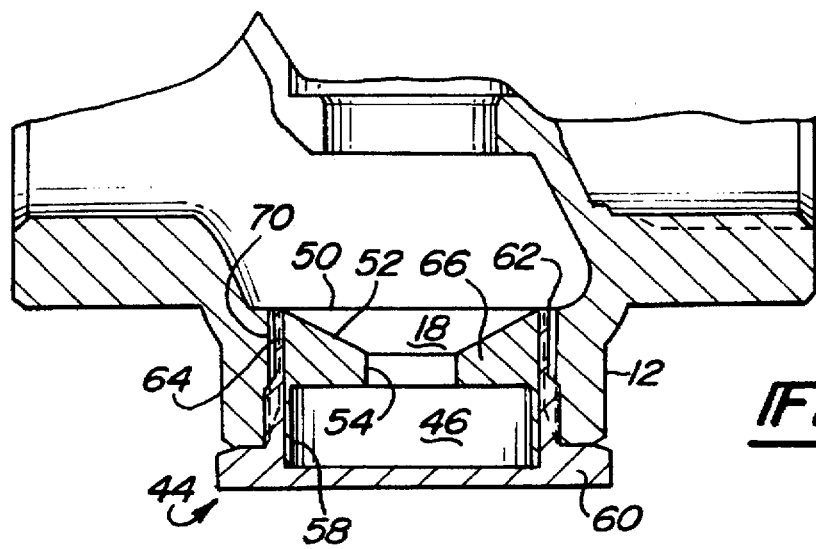
FIG. 4 is a cross-sectional view of a third alternative embodiment of the valve body.

In a second alternative embodiment, as illustrated in FIG. 3, dirt trap 18 may be further provided with a cavity region 46. Cavity 46 is formed by cap 44 having an upper wall 52 of decreasing diameter extending from dirt trap opening entrance 50 toward a middle wall 54 of constant diameter which extends toward a lower wall 56 of increasing diameter. FIG. 4 illustrates a third alternative embodiment, where the cavity region 46 is formed by cap 44 having upper wall 52 of decreasing diameter extending from dirt trap opening entrance 50 toward middle wall 54 of constant diameter which extends toward a stepped increase in diameter forming lower wall 58. Additionally, valve body 12 may include a vane or ribs to direct particulates into dirt trap 18.

Port 20 includes a port opening entrance 22, a port wall 24, an undercut 26, and a land 28. (See also FIG. 1b.) Port opening 22 is adjacent to inlet passageway 15. Port 20 has a decreasing diameter from port opening 22 toward undercut 26. In the preferred embodiment, the cross-sectional area of port 20 is circular, and the diameter is greatest at port opening 22 and decreases continuously toward undercut 26. This decrease in diameter provides an angle between port wall 24 and longitudinal axis 40 of plug assembly 32. The goal is to maximize this angle. This angle can be in the range of from about 15 to 45 degrees, a more preferred embodiment having an angle of 30 degrees. In the preferred embodiment the decrease in diameter is at a uniform rate. However, the decrease of port 20 diameter could be at varying rates.

Undercut 26 is located adjacent to port wall 24 and is formed by a stepped decrease in diameter of port 20. This stepped decrease in diameter provides an angle between port wall 24 and the longitudinal axis 40 in the range of about 60 to 90 degrees, a more preferred embodiment having an angle of about 90 degrees. In the preferred embodiment for a valve 10 having a port 20 with a diameter of about 0.5 inches, the stepped decrease is accomplished by reducing the radius of port 20 at least 0.015 inches. While any stepped reduction in diameter forming an undercut has incremental benefits, the undercut area should be maximized provided there is sufficient strength to support the pressure of seat 30 when plug 34 is actuated to a closed position. Land 28 is essentially parallel to plug 34 forming the area of minimum clearance between port 20 and plug 34.

Land 28 is the region of minimum port 20 diameter where the port transitions into the valve seat 30. Seat 30 in conjunction with land 28 and undercut 26 must have sufficient strength to support the pressure of seat 30 when plug 34 is actuated to a closed position. In the preferred embodiment, land 28 has a curved profile originating at undercut 26 and terminating at seat 30. Generally, for a port 20 having a diameter in the range of 0.5 inches, the length of land 28 is no greater than 0.080 inches. In the preferred embodiment land 28 is of minimal length sufficient to withstand the pressure on seat 30 when plug 34 is actuated to the closed position.

Plug assembly 32 includes a stem 38 and plug 34 which are connected and have a common longitudinal axis 40. Plug 34 is provided with a plug end 35 and a transitional edge 36 having a transitional edge origin 37. In the preferred embodiment transitional edge 36 is a beveled edge which provides a plowing effect when plug assembly 32 is translated to the close position. The plowing effect, guides the particles away from seat 30 and land 28. In an alternative embodiment transitional edge 36 is defined by a radial transition to plug end 35. Plug 34 extends along the longitudinal axis 40 such that the transitional edge origin 37 is at or beyond the end of land 28 when plug 34 is located at a position permitting a predetermined maximum flow through valve 10. The end of land 28 is the area of land 28 that is closest to undercut 26.

Actuator 42 is attached to stem 38 with means to translate the plug assembly 32 along the longitudinal axis 40 of plug assembly 32. Actuator 42 may be configured to translate plug assembly 32 in response to either a pneumatic or electronic control signal.

Particles present in a system are introduced into valve 10 through inlet 14. Plug chamfer 36 which extends beyond land 28 acts to deflect and deter particles from entering into the minimum port 20 to plug 34 clearance. Particles which nonetheless enter port 20 will continue through port 20 and exit outlet 16. However, those particles which have a diameter larger than the clearance between plug 34 and land 28 may become lodged between the plug 34 and land 28. As actuator 42 translates the plug assembly 32 into port 20, particles lodged between plug 34 and land 28 are pushed and released into the undercut area 26 and then guided out of port 20 along port wall 24. The increasing diameter of port 20 from the undercut region 26 toward port opening 22 aids in the removal of the particle from the critical land 28 permitting full closure of plug assembly 32 onto seat 30. Once the flow is ceased, the particle through the force of gravity falls into dirt trap 18 located beneath port 20. The depth and size of dirt trap 18 acts to prevent the particle from returning to circulation and re-entering port 20. The alternative embodiments, illustrated in FIGS. 3 and 4, enhance the prevention of particulates from re-entering port 20 where dirt trap 18 includes cavity 46. Cavity 46 serves to reduce the flow at the bottom of the dirt trap as well as to minimize the passage area from which particulates may escape. In the alternative embodiments, as illustrated in FIGS. 2–4, dirt trap 18 is formed by a removable cap 44 permitting particulates to be removed from the system.

Figure 5:
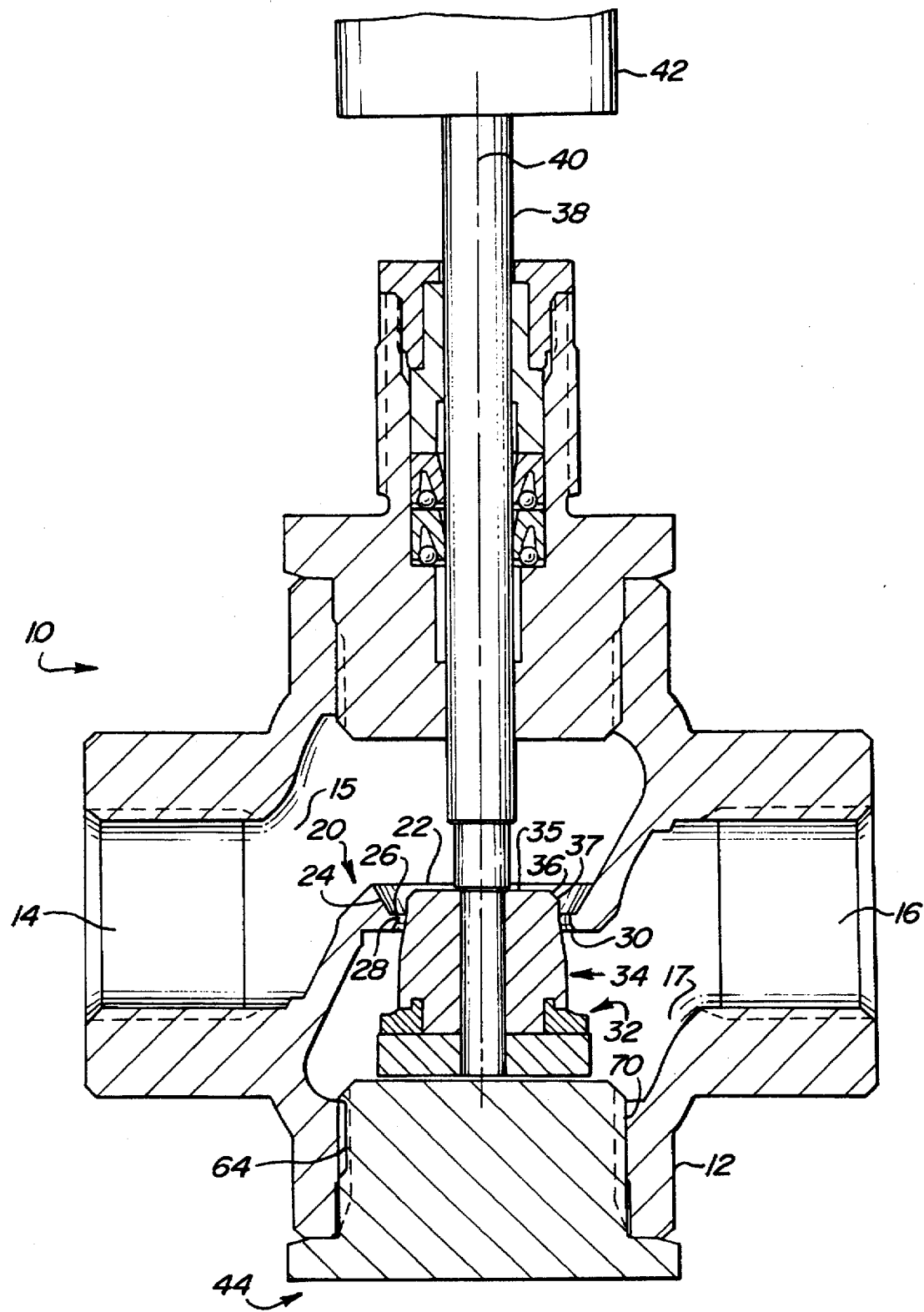
FIG. 5 is a cross sectional view of a push down to open valve in an open position.

Although the invention has been described in conjunction with specific embodiments thereof, it is evident that alternatives, modifications and variations will be apparent to those skilled in the art. For example port 20 may have an oval cross section, having a major and minor diameter. In addition, seat 30 may have various configurations such as a seat having a raised radial lip. Likewise, many components of valve 10 such as body 12 and plug 34 may be fabricated from brass. However depending upon the application other material may be more suitable. Furthermore the valve may have a push down to open (see FIG. 5), three way mixing or diverting configurations. Also each of the features described can be used independently to provide incremental improvement as well as together for maximum advantage. It is intended that the claims embrace these and other alternatives, modifications and variations which fall within the spirit and scope of the appended claims.

We claim:

1. A valve comprising:

a plug assembly including a plug having a transitional edge, the transitional edge comprising a relieved surface formed at a distal portion of a substantially cylindrical extension end of the plug, the extension end and the transitional edge extending from the plug through the valve seat opening when the valve is in a closed position thereby providing a plowing effect for guiding particles away from the valve seat as the valve is closed and permitting a predetermined maximum flow through the valve when the valve is at a predetermined position;

a valve body including a valve seat and a port extending from an opening entrance to the valve seat, where the diameter of the port decreases continuously to provide a surface extending from the opening entrance toward the valve seat at an angle, the port further including a land region where the port transitions into the valve seat;

a dirt trap formed in the valve body, the trap having a generally cylindrical shape, an inlet having a diameter at least equal to the port opening entrance diameter and a depth at least equal to the inlet diameter; and an actuating mechanism configured to translate the plug assembly within the port in response to a control signal.

2. The valve of claim 1, wherein the port includes a stepped decrease in diameter adjacent to the land region.

3. The valve of claim 2, wherein the stepped decrease in diameter is at least 0.030 inches and the land region extends a distance no greater than 0.080 inches.

4. The valve of claim 1 wherein the dirt trap is aligned in opposition to the port.

5. A valve comprising:

a plug assembly;

a valve body including a valve seat and a port extending from an opening entrance to the valve seat, where the diameter of the port decreases continuously to provide a surface extending from the opening entrance toward the valve seat at an angle, the port further including a land region where the port transitions into the valve seat and wherein the plug has a transitional edge, the transitional edge comprising a relieved surface formed at a distal portion of a substantially cylindrical extension end of the plug, the extension end and the transitional edge extending from the plug through the opening when the valve is in a closed position thereby providing a plowing effect for guiding particles away from the valve seat as the valve is closed and permitting a predetermined maximum flow through the valve when the valve is at a predetermined position;

a dirt trap formed in the valve body, the trap having a generally cylindrical shape, an inlet having a diameter at least equal to the port opening entrance diameter and a depth at least equal to the inlet diameter and wherein the dirt trap further comprises an upper wall of decreasing diameter extending from the inlet toward a middle wall of constant diameter which extends to a cavity region; and an actuating mechanism configured to translate the plug assembly within the port in response to a control signal.

6. The valve of claim 5, wherein the cavity region has one of a cylindrical shape and a truncated conical shape.

7. A valve comprising:

a valve body including a port extending from an opening entrance to a valve seat, where the diameter of the port is greater at the opening entrance than at the valve seat, the port further including a land region of minimum port diameter where the port transitions into the valve seat; and a plug assembly including a plug having a transitional edge, the transitional edge comprising a relieved surface formed at a distal portion of a substantially cylindrical extension end of the plug, the extension end and the transitional edge extending from the plug through the valve seat opening when the valve is in a closed position thereby providing a plowing effect for guiding particles away from the valve seat as the valve is closed and for permitting a predetermined maximum flow through the valve when the valve is at a predetermined position;

a dirt trap formed in the valve body, the trap having a generally cylindrical shape, a inlet having a diameter at least equal to the port opening entrance diameter and a depth at least equal to the inlet diameter; and an actuating mechanism configured to translate the plug assembly within the port in response to a control signal.

8. The valve of claim 7, wherein the diameter of the port decreases continuously to provide a surface defining the port at an angle in the range of 15 to 45 degrees to the longitudinal axis of the plug.

9. The valve of claim 7, wherein the dirt trap further comprises an upper wall of decreasing diameter extending from the inlet toward a middle wall of constant diameter which extends to a cavity region.

10. The valve of claim 9, wherein the cavity region has one of a cylindrical shape and a truncated conical shape.

11. The valve of claim 7, wherein the port includes a stepped decrease in diameter adjacent to the land region.

12. The valve of claim 11, wherein the stepped decrease in diameter is at least 0.030 inches and the land region extends a distance no greater than 0.080 inches.

* * * * *